(12) United States Patent
Heiden et al.

(10) Patent No.: US 11,338,713 B2
(45) Date of Patent: May 24, 2022

(54) VEHICLE SEAT COVER AND VEHICLE SEAT

(71) Applicant: Faurecia Autositze GmbH, Stadthagen (DE)

(72) Inventors: Sascha Heiden, Langenhagen (DE); Frank Urban, Stadthagen (DE)

(73) Assignee: Faurecia Autositze GmbH, Stadthagen (DE)

( * ) Notice: Subject to any disclaimer, the term of this patent is extended or adjusted under 35 U.S.C. 154(b) by 0 days.

(21) Appl. No.: 17/029,504

(22) Filed: Sep. 23, 2020

(65) Prior Publication Data

US 2021/0086671 A1    Mar. 25, 2021

(30) Foreign Application Priority Data

Sep. 24, 2019 (DE) .................. 202019105274.0

(51) Int. Cl.
*B60N 2/60* (2006.01)

(52) U.S. Cl.
CPC .......... *B60N 2/6081* (2013.01); *B60N 2/6036* (2013.01)

(58) Field of Classification Search
CPC ...... B60N 2/6018; B60N 2/6036; A47C 31/11
USPC ........................................................ 297/220
See application file for complete search history.

(56) References Cited

U.S. PATENT DOCUMENTS

| | | | | |
|---|---|---|---|---|
| 4,848,836 A * | 7/1989 | Masui | .............. | B60N 2/80 297/220 |
| D405,637 S * | 2/1999 | Licata | ................ | D6/611 |
| 7,472,953 B1 * | 1/2009 | Lalji | .............. | B60N 2/6027 297/224 |
| 2006/0087163 A1 | 4/2006 | Cilluffo | | |
| 2017/0361739 A1 | 12/2017 | Nishino | | |
| 2018/0186262 A1 * | 7/2018 | Saadatjoo | ........... | B60N 2/6018 |
| 2019/0009728 A1 | 1/2019 | Sharon | | |
| 2021/0188139 A1 * | 6/2021 | Fang | ................ | B60N 2/6036 |

FOREIGN PATENT DOCUMENTS

| | | |
|---|---|---|
| CN | 207028949 U | 2/2018 |
| CN | 207657660 U | 7/2018 |
| DE | 102006022016 B3 | 8/2007 |
| FR | 3028161 A1 | 5/2016 |
| JP | H01143998 U | 6/1989 |
| JP | 2006218115 A | 8/2006 |

OTHER PUBLICATIONS

European Search Report for European App. No. 20197834.3 dated Jan. 20, 2021, 21184 EP, 7 pages, (No English Translation Available).

* cited by examiner

*Primary Examiner* — Sarah B McPartlin

(74) *Attorney, Agent, or Firm* — The Sladkus Law Group

(57) ABSTRACT

The present disclosure relates to a vehicle seat cover designated for a detachable attachment to a headrest of a vehicle seat. The vehicle seat cover comprises a pliable first layer with a first recess and a pliable second layer with a first recess, the recesses being configured for accommodating the headrest rod. The recesses each have an edge opening. In the state of the vehicle seat cover attached to the headrest rod one edge opening is partially or completely covered by an edge which limits the other recess.

1 Claim, 7 Drawing Sheets

VEHICLE SEAT COVER AND VEHICLE SEAT

PRIORITY CLAIM

This application claims to German Utility Model Application No. DE 20 2019 105 274.0, filed Sep. 24, 2019, which is expressly incorporated by reference herein.

BACKGROUND

The present disclosure relates to a vehicle seat cover which is designated for a detachable attachment to a vehicle seat. The vehicle seat cover might e.g. be a backrest cover as e.g. a heating mat or massage mat or a protective cover. It is also possible that the vehicle seat cover is a headrest cover which can be arranged in the contact region of the head of the driver or passenger with the headrest and which can be exchanged when spoiled and/or which can be washed. Furthermore, the present disclosure relates to a vehicle seat with a vehicle seat cover of this type.

SUMMARY

According to the present disclosure, a vehicle seat cover may be detachably attached or mounted to a vehicle seat. The vehicle seat cover comprises an attachment portion. In the region of the attachment portion it is possible to attach, mount or fix the vehicle seat cover to a headrest rod of the vehicle seat. It is also possible that in the attachment portion the vehicle seat cover is fastened, mounted or fixed to a guiding device for the headrest rod, for example, the guides and flanges of the backrest for the headrest rods.

In illustrative embodiments, a vehicle seat cover may be detachably attached to a vehicle seat, the vehicle seat cover in particular being improved with respect to a simplification of an attachment and/or dis-attachment to the vehicle seat and/or the reliability of the attachment to the vehicle seat (e.g. during driving, during movements of the vehicle or passenger on the vehicle seat and/or during a crash).

In illustrative embodiments, the attachment portion comprises two layers arranged one above the other. These layers are pliable so that the layers can be deformed by the user in a simple way during the fastening and unfastening or attachment and dis-attachment. The pliable layers in particular do not have an own rigidity so that the pliable layers can be brought into different geometries without considerable elastic returning forces. Here, the different geometries of the layers are preferably stable without returning forces so that after the deformation the layers are able to remain in the respective geometry. In order to mention only non-limiting examples the layers can be manufactured from a textile material, a web, fabric, tissue, woven fabric, knitted fabrics, non-woven fabric, net-like material and the like. Here, the layers might also consist of a plurality of sublayers and/or a plurality of components. The layers might also comprise strengthening elements that can be plastically deformed. However, the present disclosure also covers layers which comprise rigid sub-portions which can then be connected to each other by pliable sub-portions or folding lines or folding edges.

In illustrative embodiments, the layers each comprise a recess. The recess is designated for accommodating the headrest rod or guiding device. Accordingly, the recess is dimensioned corresponding to the geometry of the headrest rod or guiding device. The recesses of the two layers each comprise an edge opening by which it is possible to introduce the headrest rod or guiding device into the recess of the respective layer.

On the one hand it is useful that it is easy to access the edge opening in order to allow a simple insertion of the headrest rod or guiding device. This generally occurs via a large dimensioning of the edge opening. However, on the other hand an undesired exit of the headrest rod or guiding device from the recess is to be avoided. For this aim the edge opening should be chosen as small as possible. This conflict of aims is solved by the present disclosure in that for an inventive vehicle seat cover in a top view (or in a projection along the longitudinal axis of the headrest rod) the edge opening of one layer is (partially or completely) covered by an edge of the recess of the other layer. For one possible embodiment of the present disclosure this design allows to generally chose the edge opening of the first mentioned layer comparatively large so that a simple assembly of this layer to the headrest rod or guiding device is possible when deforming the other layer in a way such that the edge of the recess of the other layer does not cover the edge opening of the first mentioned layer. If then the other layer is transferred into the covering geometry (and if therewith the headrest rod or guiding device also enters through the edge opening into the recess of the other layer) the edge of the recess of the other layer is able to make the edge opening of the first mentioned layer smaller or to completely close the edge opening of the first mentioned layer. Accordingly, the undesired exit of the headrest rod or guiding device from the edge opening of the first mentioned layer is at least more unlikely or more difficult. The corresponding applies also for the edge opening of the recess of the second mentioned layer which can be covered (partially or completely) by an edge of the recess of the first mentioned layer.

It is possible that in the assembled state the recesses form an aligned completed recess or stacked accommodation through which the headrest rod or guiding device extends. In this fastened state then the two edge openings of the layers are not arranged one above each other but have an offset in circumferential direction of the stacked accommodation. It is possible that the edge openings are arranged on opposite sides of the stacked accommodation.

In illustrative embodiments, the attachment portion comprises a pliable upper layer with an upper recess. Furthermore, the attachment portion comprises a pliable lower layer with a lower recess. In this case the recesses form an upper edge opening and a lower edge opening. In the fastened state the upper layer and the lower layer are arranged one above the other (in particular under establishment of a large contact surface with each other) in a way such that the headrest rod or the guiding device extends through the upper and lower recesses (and through the stacked accommodation formed in this way). In a projection along the longitudinal axis of the headrest rod the lower edge opening of the lower recess is (partially or completely) covered by the edge of the upper recess of the upper layer. Alternatively or cumulatively it is possible that in a projection along the longitudinal axis of the headrest rod the upper edge opening of the upper recess is (partially or completely) covered by the edge of the lower recess of the lower layer.

Generally the edge openings of the two recesses can have an orientation in any direction provided that these directions differ from each other so that the headrest rod or guiding device has to enter into the recess and exit from the same in different directions which provides the desired securing effect.

In illustrative embodiments, the edge openings have an orientation in opposite transverse directions. Accordingly, the headrest rod or guiding device has to be inserted in one transverse direction into the recess of one layer whereas the insertion into the other layer has to be provided with an opposite transverse movement. An embodiment of this type leads to a good securing effect if a securing against forces acting in longitudinal direction is intended.

The layers can be connected to each other in any portions. Preferably, one layer is only connected or fixed in a lateral side region to the other layer which might allow a kind of "unfolding" or "folding in opening direction" of the two layers for the fastening and/or unfastening or assembly and/or disassembly.

There are a lot of options for the way of connecting the two layers. Without a limitation of the present disclosure to this embodiment being intended, it is e.g. possible that the layers are connected by a bonding or a seam.

It is possible that the layers of the vehicle seat cover are only connected to each other by at least one permanent connection which is responsible for the integrity and also the provision of the securing effect. For one particular proposal of the present disclosure the two layers can be connected to each other in the state fastened to the vehicle seat by an additional detachable connection which might e.g. be a hook-and-loop-fastener. Preferably, with the fixed connection and the additional detachable connection the two layers form a closed ring. The headrest rod or guiding device is then enclosed by the ring.

The securing effect of the vehicle seat cover on the vehicle seat might at least partially base on the effect that a removal of the partial or complete covering of one edge opening of a recess of one layer by the edge of the recess of the other layer requires a relative movement of the two layers contacting each other which again requires to overcome the friction being effective between the layers. This contribution to the securing effect might be increased by one proposal of the present disclosure suggesting that at least one layer comprises a coating increasing the friction or a friction element (e.g. having a friction surface) in the contact region with the other layer.

It is generally possible that the vehicle seat cover is only held on one single headrest rod or guiding device by means of the two layers, the recesses and the respective edge openings. However, it is also possible that the layers each comprise two recesses with edge openings which are then each designated for a respective headrest rod or guiding device. In this case the vehicle seat cover is held at two headrest rods or guiding devices and the securing effect might be increased and/or a precise definition of a position and orientation of the vehicle seat cover relative to the vehicle seat can be provided. Within the frame of the present disclosure there are a lot of options for the type of vehicle seat cover. For one proposal of the present disclosure the vehicle seat cover is a backrest cover which can preferably be placed on the front side of the backrest of the vehicle seat.

In illustrative embodiments, the vehicle seat cover is a headrest cover with the fastening of the headrest cover to the headrest rods being provided by the measures described before. In this case the headrest cover might also comprise a hook-and-loop-fastener in the end region opposite to the attachment portion. By the hook-and-loop-fastener this end region can be fastened to an upper surface of the headrest.

In illustrative embodiments, a vehicle seat is proposed which comprises a backrest cover as explained above. The backrest cover is fastened in the attachment portion to at least one headrest rod or at least one guiding device. The headrest cover then extends from the attachment portion along the front side of the backrest in downward direction. It is possible that the backrest cover (except its fastening by means of the attachment portion) is loosely lying on the vehicle seat or fixed to the same by means of additional attachment portions.

In illustrative embodiments, a vehicle seat is proposed, a headrest cover being fastened to the headrest rod in the attachment portion. In this case the headrest cover extends from the attachment portion along the front side of the headrest in downward direction. As explained before, here it is possible that the headrest cover is detachably fastened to the upper surface of the headrest.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the figures for components or technical details which correspond to each other with respect to the constructive design and/or function partially the same reference numbers are used. These components or technical details are then distinguished from each other by an additional letter a, b, etc. In this case reference can be made to these components or details without the use of the additional letter which then refers to single or all of these components or details.

Figure 1:
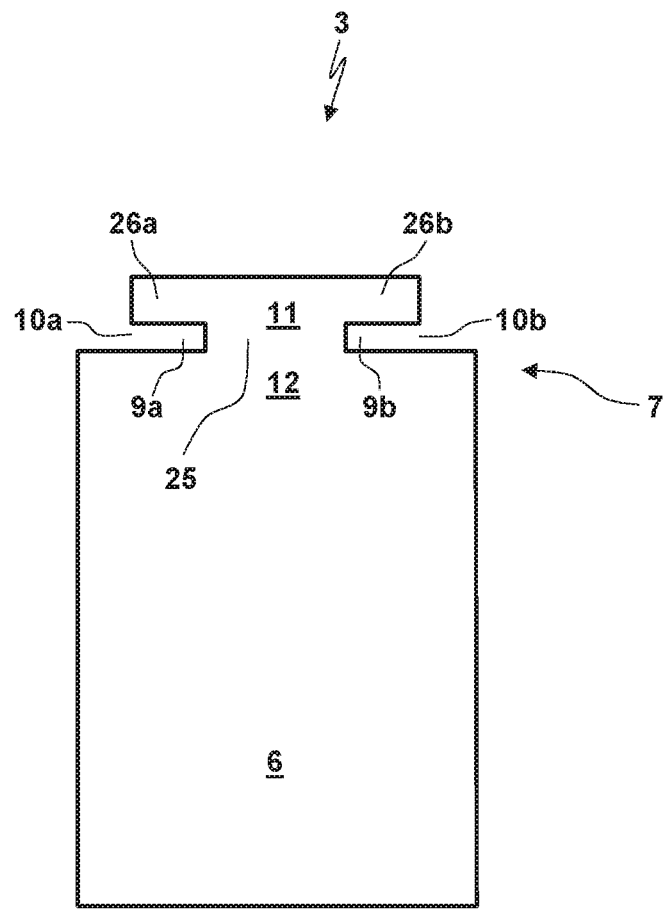
FIG. 1 is a top view shows an upper layer of a vehicle seat cover.
Figure 2:
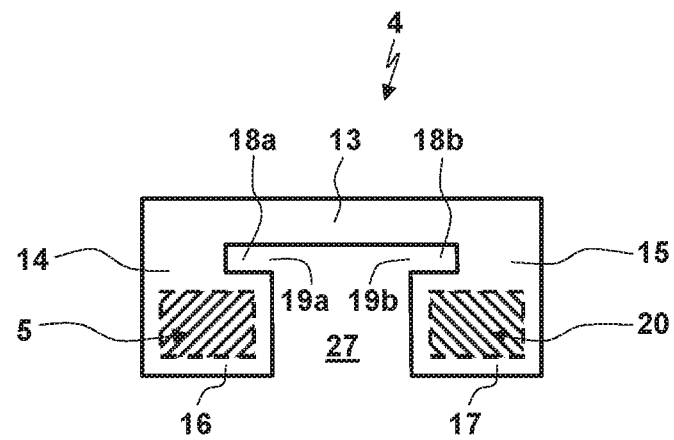
FIG. 2 is a top view shows a lower layer of a vehicle seat cover.

A vehicle seat cover 1 (here embodied as backrest cover 2) comprises an upper layer 3 (shown in a top view in FIG. 1) and a lower layer 4 (shown in a top view in FIG. 2). The upper layer 3 and the lower layer 4 are connected to each other by a connection 5 (preferably a fixed and non-detachable connection). The upper layer 3 comprises a functional region 6 which serves for the provision of the main function of the vehicle seat cover 1 (e.g. the covering or the protection of the vehicle seat, a massage function, a heating function and the like). Furthermore, the upper layer 3 comprises an attachment portion 7. In the attachment portion 7 on the one hand the two layers 3, 4 can be connected or fastened to each other. On the other hand, in the attachment portion 7 the vehicle seat cover 1 can be fastened to at least one headrest rod 8a, 8b. Here, at least a part of the attachment portion 7 might also serve for providing the main function so that the functional region 6 and the fastening region 7 might partially or completely overlap.

In the attachment portion 7 the upper layer 3 comprises recesses 9a, 9b each comprising an edge opening 10a, 10b. The recesses 9 comprise a cross-section that corresponds to the cross-section of the headrest rods 8 or might be larger than the same by a certain extent. The size of the edge opening 10 corresponds to the size of the cross-section of the headrest rods 8. Accordingly, the headrest rods 8 are each able to enter via the edge opening 10 into the recess 9. The edge openings 10 have an orientation in opposite directions. In FIG. 1 these directions have an orientation in transverse direction. Accordingly, the headrest rods 8 are able to enter in transverse direction through the edge opening 10 into the recess 9 and to exit in opposite direction from the recess 9. According to FIG. 9 the edge openings 10 have an orientation in transverse and outer direction.

It is possible that corresponding to FIG. 1 the attachment portion 7 of the upper layer 3 comprises a T-shaped protrusion 11. Here, the width of the vertical leg 25 of the T corresponds to the intermediate space between the two headrest rods 8a, 8b. The recesses 9 are limited by the lower edge of the horizontal legs 26a, 26b of the T, the lateral edge of the vertical leg 25 of the T and an upper edge of a base body 12 of the upper layer 3 from which the T-shaped protrusion 11 extends. The width of the edge opening 10 corresponds to the distance of the lower edge of the horizontal leg 26a, 26b of the T and the upper edge of the base body 12. Without this necessarily being the case the extension of the horizontal leg 26a, 26b of the T is smaller than the transverse extension of the base body 12 of the upper layer 3. The transverse extension of the horizontal leg 26 of the T is at least as large as the outer distance of the headrest rods 8a, 8b.

According to FIG. 2 the lower layer 4 has (in a first approximation) a design corresponding to an inverted U having a base leg 13 and two side legs 14, 15. The side legs 14, 15 are parallel to each other and extend in downward direction. In the end region facing away from the base leg 13 the side legs 14, 15 each comprise an angled portion 16, 17 angled in inner direction. The angled portions 16, 17 have an orientation parallel to the base leg 13. However, there is still an intermediate space 27 between the front faces of the angled portions 16, 17. The transverse extension of the intermediate space 27 is preferably as large as the inner distance of the two headrest rods 8a, 8b. Recesses 18a, 18b are formed between the base leg 13 and the angled portions 16, 17. The recesses 18a, 18b each comprise an edge opening 19a, 19b. The recesses 18 are limited by the upper edge of the respective angled portion 16, 17, the inner edge of the respective side leg 14, 15 and the lower edge of the base leg 13. The width of the edge opening 19 is defined by the distance of the upper edge of the angled portion 16, 17 from the base leg 13.

For this embodiment of the layers 3, 4 of the vehicle seat cover 1 the recesses 9, 18 have slits of constant and equal widths. It is generally possible that the recesses 9, 18 comprise slits with any varying width. It is e.g. also possible that the widths of the slits are smaller in the region of the edge openings 10, 19 ending with a slit having a minimum slit width so that then in the region of the edge opening 10, 19 the limiting edges abut each other or they are arranged directly adjacent to each other.

For the formation of the vehicle seat cover 1 the upper layer 3 is fixedly connected by a connection 5 to the lower layer 4. The connection 5 might e.g. be a bond, a seam, an adhesive connection or any other material connection and the like. Preferably the connection 5 is arranged in the region of an angled portion 16 of the layer 4 and in a lateral side region of the base body 12 of the layer 3. It is optionally also possible that the layers 3, 4 are additionally connected by a detachable connection 20 which might e.g. be a loop-and-hook-fastener. The connection 20 might e.g. be arranged in the region of the other angled portion 17 of the layer 4 and in the other lateral side region of the base body 12 of the layer 3.

Figure 3:
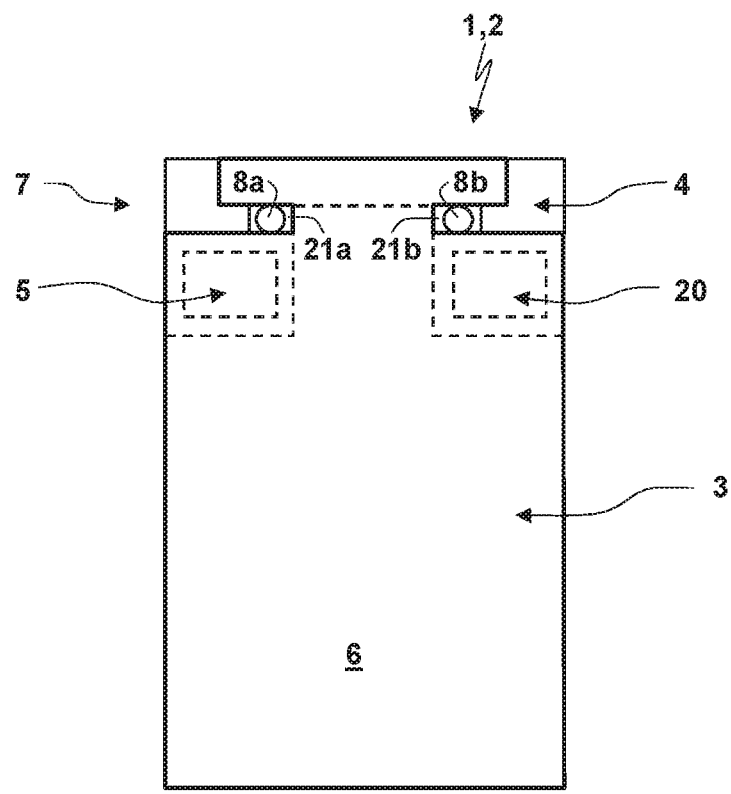
FIG. 3 is a top view shows a vehicle seat cover with the upper layer of FIG. 1 and the lower layer of FIG. 2.

In FIG. 3 the edges of the lower layer 4 covered by the upper layer 3 are indicated by dashed lines. In FIG. 3 it can be seen that the pair of recesses 9a, 18a [respectively 9b, 18b] in the vehicle seat cover 1 form a stacked accommodation 21a [respectively 21b] wherein the headrest rods 8a [respectively 8b] are arranged and enclosed in the top view. In the top view of FIG. 3 the headrest rods 8a, 8b are enclosed by the material of the layers 3, 4 in any direction in the drawing plane and extensional plane of the layers 3, 4. In the top view the stacked accommodations 21 are limited by the inner edges of the side legs 14, 15, the upper edge of the angled portions 16, 17 and the lower edge of the base leg 13 of the lower layer 4 and by the lower edge of the horizontal leg 26a, 26b of the T, a lateral edge of the vertical leg 25 of the T and the lower edge of the base body 12 of the upper layer 3.

The layers 3, 4 contact each other with the establishment of a friction force in the region of contact surfaces between the horizontal leg 26 of the T of the upper layer 3 and the base leg 13 of the lower layer 4 and between the angled portions 16, 17 of the lower layer 4 and the lateral upper end regions of the base body 12 of the upper layer 3.

Figure 4:
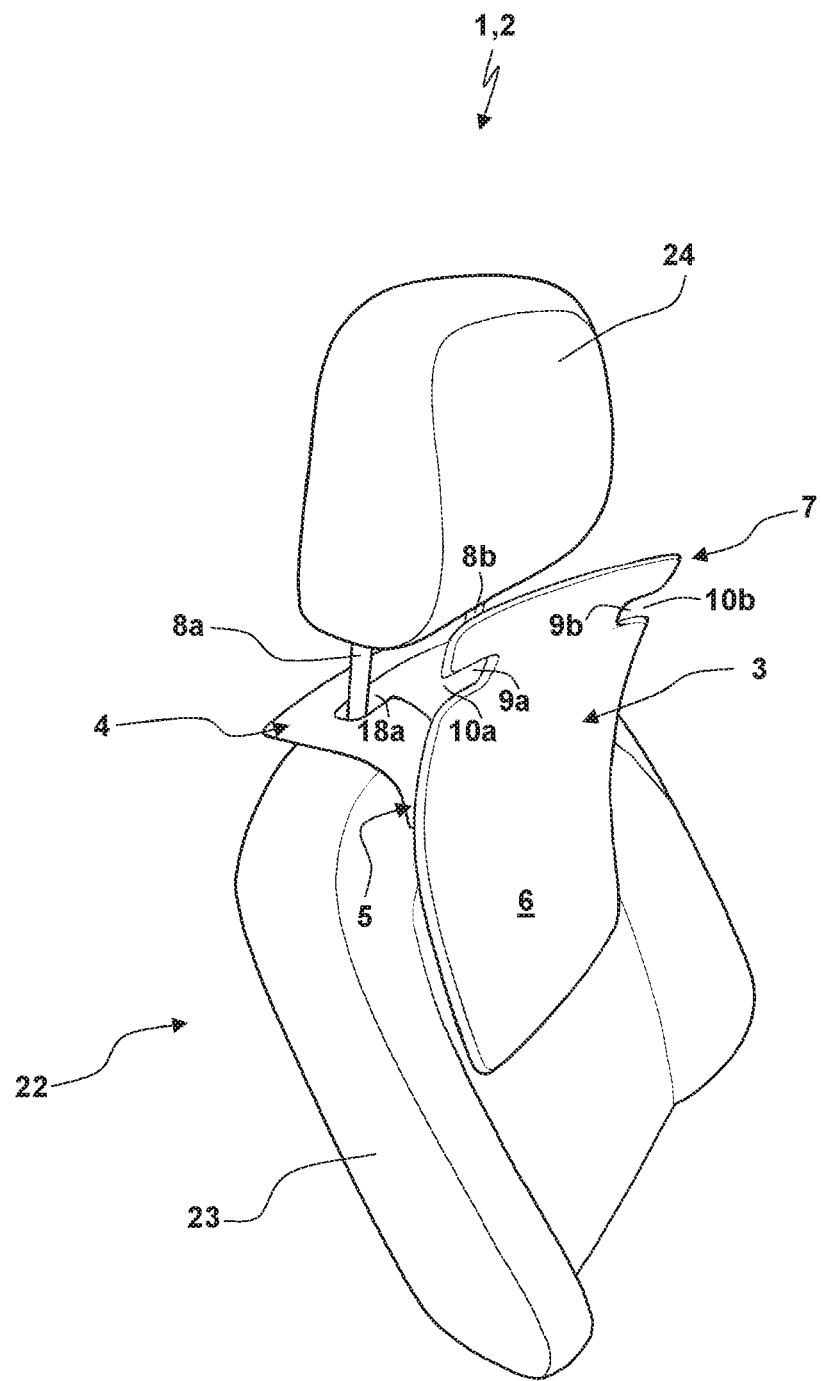
FIGS. 4 and 5 are a three-dimensional view show a vehicle seat with a vehicle seat cover of FIG. 3 partially assembled (FIG. 4) and completely assembled (FIG. 5)

FIG. 4 shows the fastening or assembly of the vehicle seat cover 1 to a vehicle seat 22. The vehicle seat 22 comprises a backrest 23 and a headrest 24 which are held by headrest rods 8a, 8b (in particular in a telescopic way) on the backrest 23. For the assembly or fastening the two layers 3, 4 are separated from each other at a position remote from the connection 5 and folded away from each other. At first the left headrest rod 8a is inserted into the recess 18a of the layer 4. By a deformation of the lower layer 4 in the region of the base leg 13, the side leg 15 and/or the angled portion 17 then (for the headrest rod 8a arranged in the recess 18a) also the headrest rod 8b is inserted into the recess 18b of the layer 4. Then the lower layer 4 is transferred into a planar state wherein the angled portion 17 closes around the headrest rod 8b. In this planar state the lower layer 4 (as can be seen in FIG. 4) contacts the upper surface of the backrest 23. Subsequently the upper layer 3 is also deformed in reward direction. Preferably the horizontal legs 26 of the T are angled in a way such that the headrest rods 8a, 8b are able to enter into the recesses 9a, 9b. Subsequently the horizontal legs 26 of the T are then folded back into the plane so that the headrest rods 8a, 8b are trapped between the horizontal legs 26 of the T and the base body 12.

Figure 5:
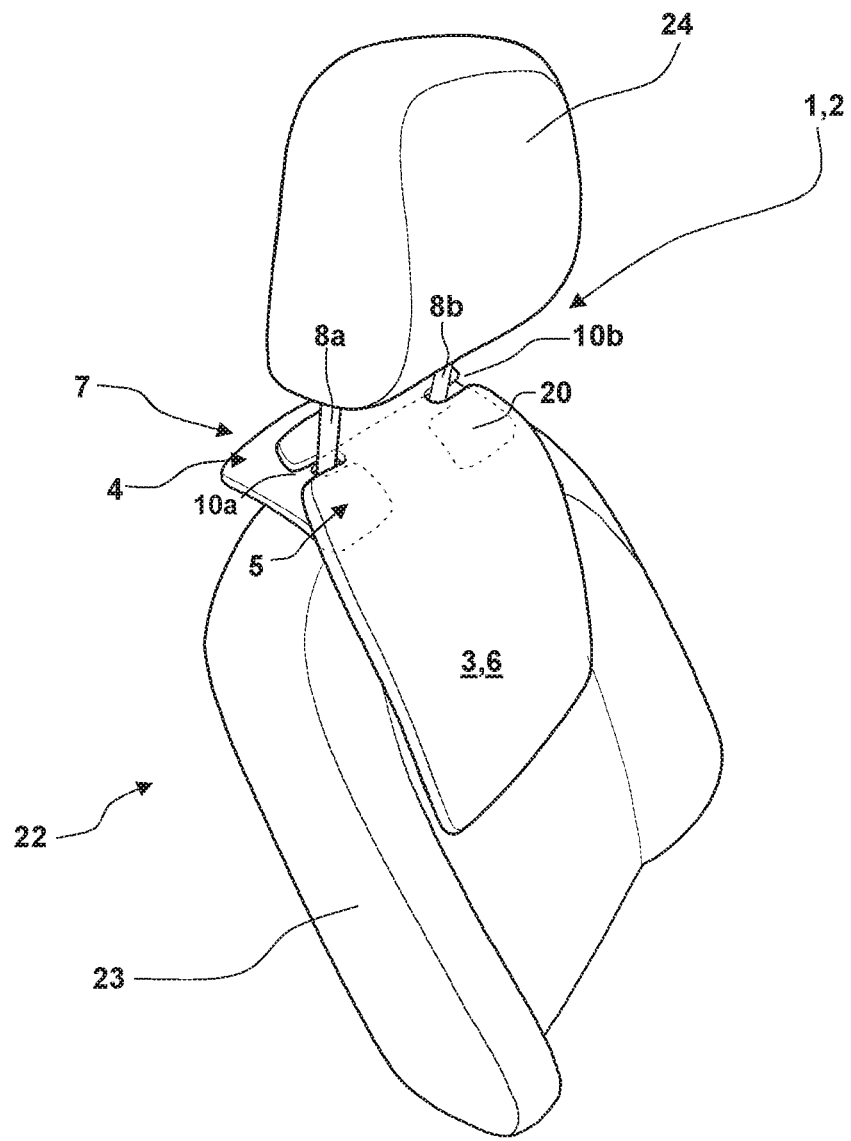

FIG. 5 shows the fastened or assembled state. In this fastened or assembled state the headrest rods 8 extend through the stacked accommodation 21 formed by the recesses 9, 18. The headrest rods 8 are surrounded in all directions by the material of the layers 3, 4. An exit of the headrest rods 8 from the stacked accommodation 21 requires a deformation of at least one of the layers 3, 4. For the deformation it is required to overcome the friction between the layers 3, 4 and/or a change of the geometry by a deformation of at least one of the layers 3, 4 is required. In the case that additional to the connection of the layers 3, 4 by the connection 5 also an additional connection in the fastened state is provided by a detachable connection 20 (as e.g. a hook-and-loop-fastener), the layers 3, 4 form a closed ring which surrounds the two headrest rods 8a, 8b.

Figure 6:
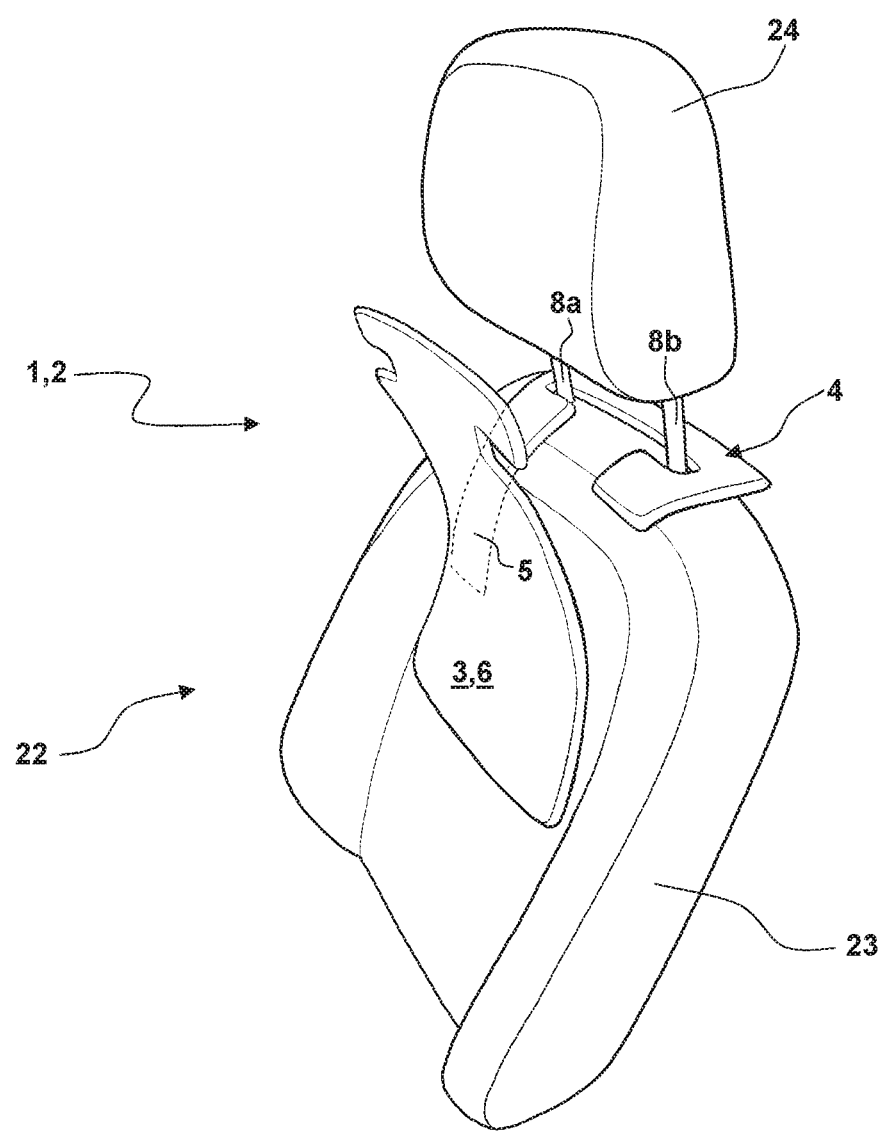
FIG. 6 is a three-dimensional view shows a vehicle seat with another embodiment of a vehicle seat cover.

FIG. 6 shows a modified embodiment wherein the upper layer 3 of the vehicle seat cover 1 has a design generally corresponding to FIG. 1. However, the lower layer 4 has a larger longitudinal extension in the region of the angled portion 16 so that a larger area for the connection 5 is provided or a connection between the two layers 3, 4 can be provided at a position with a larger distance from the recesses 9, 18 which might in some cases lead to a further simplification of the assembly and disassembly.

For the orientation of the recesses 9, 18 and the associated edge openings 10, 19 there are a lot of options within the frame of the present disclosure. As an example FIGS. 7 to 9 show an embodiment wherein the recesses 9a, 9b have an orientation in longitudinal direction and the edge openings 10a, 10b have an orientation in upward direction whereas the recesses 18a, 18b have an orientation in transverse direction and the edge openings 19a, 19b have an orientation in lateral direction.

Figure 7:
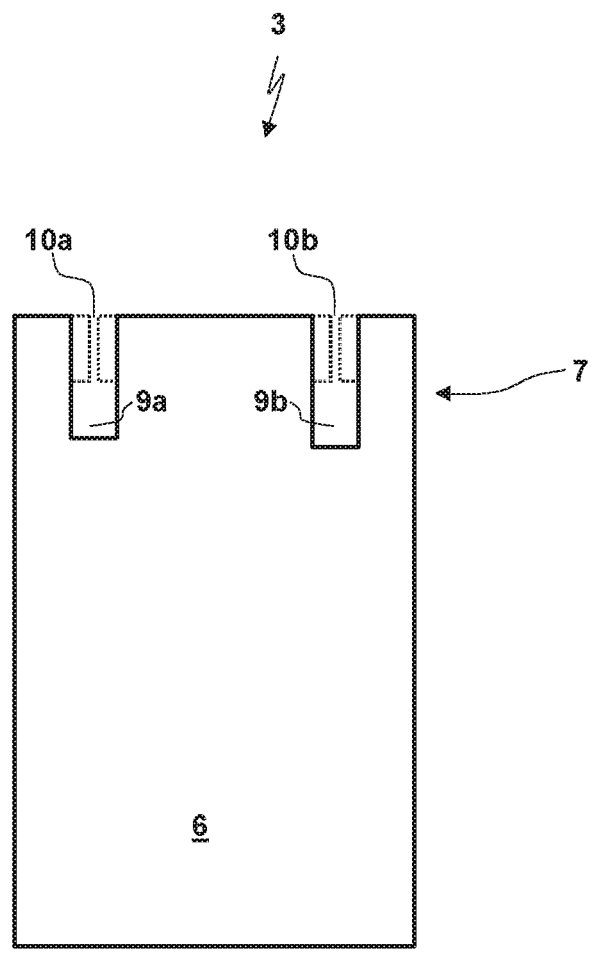
FIG. 7 is a top view shows an upper layer for another embodiment of a vehicle seat cover.
Figure 8:
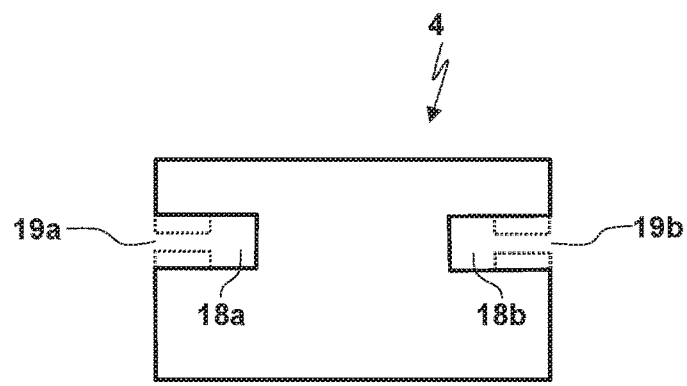
FIG. 8 is a top view shows a lower layer for another embodiment of a vehicle seat cover.
Figure 9:
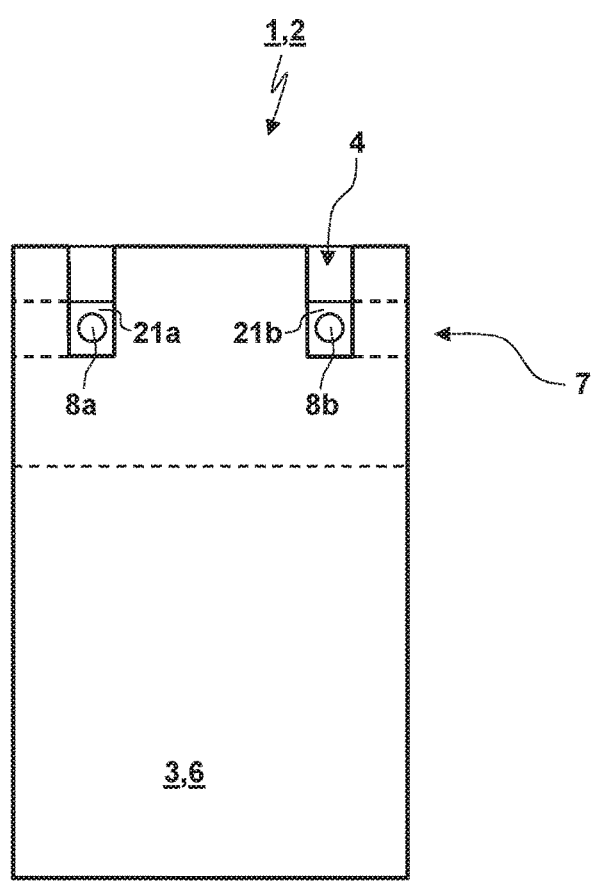
FIG. 9 is a top view shows a vehicle seat cover with the upper layer of FIG. 7 and the lower layer of FIG. 8.

In FIGS. 7 and 8 an alternative embodiment for the contour of the recesses 9, 18 as well as the edge openings 10, 19 is shown with dotted lines. Here, the edge opening 10, 19 has a design narrowed when compared to the cross-section of the recess 9, 18 and a width of the slit in the region of the edge openings 10, 19 has been minimized.

The skilled person will see that the recesses 9, 18 and the associated edge openings 10, 19 might have any orientation provided that the edge openings 10, 19 are inclined relative to each other.

Furthermore it is possible that the layers 3, 4 are exchanged against each other so that a layer here denoted as upper layer 3 might (with the same or a similar geometry) in fact be a lower layer and a layer denoted as the lower layer 4 might (with the same or a similar geometry) be an upper layer.

For the shown embodiment the functional region 6 is formed by the upper layer. However, it is generally also possible that the functional region 6 is formed by the lower layer or by both layers 3, 4.

Many variations and modifications may be made to the preferred embodiments of the present disclosure without departing substantially from the spirit and principles of the present disclosure. All such modifications and variations are intended to be included herein within the scope of the present disclosure, as defined by the following claims.

An entertainment device (as a video system, DVD-system and/or an audio system) by a rigid console may be mounted to a headrest rod of a headrest of a vehicle seat. The entertainment device is arranged at the rear side of the vehicle seat so that the entertainment device is in the viewing region of a passenger being seated behind the vehicle seat on a rear bench seat. For a first embodiment the console comprises two hooked elements on the front side, the hooked elements each have openings opening in the same transverse direction. The distance of the hooked elements corresponds to the distance of the headrest rods of the vehicle seat. By a transverse movement the headrest rods can be introduced into the console. The headrest rods simultaneously enter via the openings into accommodations formed by the hooked elements. It is possible that in the region of the openings the hooked elements form narrowings of the accommodations so that for the entry of the headrest rods into the openings it is required to elastically widen the hooked elements. Furthermore it is possible that the console with the hooked elements is trapped in a vertical direction between an upper surface of the backrest and flanges of the guides of the backrest for the headrest rods, these flanges having an orientation parallel to the upper surface of the backrest. For detaching the console from the headrest rods a reverse relative transverse motion is required. With an elastic widening of the hooked elements the headrest rods exit from the accommodations of the console. The rigid console forms a vertical angled portion on the rear side of the vehicle seat to which the entertainment device is mounted. The inserting movements of the headrest rods into the accommodations of the console are guided by a front edge of the console leading into the accommodation. The front edge of the console has a contour with a design such that additional to the pure transverse movement also a movement of the console in longitudinal direction of the vehicle occurs. These movements aim for making an undesired detachment of the console and so of the entertainment device from the backrest more difficult. The entertainment device can additionally be mounted to an inner frame of the backrest by a strut which extends in vertical direction and which is arranged on the rear side of the vehicle seat. Instead of using hooked elements other embodiments use a pair of hooked elements being pivoted against the bias by springs, use bores of the console through which the headrest rods can be passed for disassembled headrest, use separate U-shaped holding elements which can be releasably assembled to the console in the end regions of the side legs of the U or use U-shaped holding elements that can be screwed to the console.

Prior to the assembly of the vehicle seat to the inner chamber of the vehicle the headrest with the headrest rods is only connected by a Bowden cable to a holding and guiding device for the headrest rods in the backrest of the vehicle seat. In this state the headrest with the headrest rods is held by the Bowden cable at the holding and guiding device in a state turned in downward direction. Additional to the holding of the headrest with the headrest rods the holding and guiding device also serves for guiding the Bowden cable. The holding and guiding device is stiff and comprises an upper angled portion by which the holding and guiding device contacts the upper surface of the backrest from above. The angled portion forms lugs or hooks by which the holding and guiding device can be detachably held at guiding sleeves of the backrest for the headrest rods which can be provided by a clamping and a form lock. When a vehicle seat with the headrest held via the Bowden cable by the holding and guiding device has been introduced through a vehicle door into the interior of the vehicle and the vehicle seat has been assembled to the vehicle chassis, it is possible to remove the headrest from the holding and guiding device and to insert the headrest with the Bowden cable and the headrest rods into the guides of the backrest. As an alternative to the use of a Bowden cable a connection by an electric cable, a hydraulic hose line or a pneumatic hose line is possible. After the assembly of the headrest to the backrest then the holding and guiding device can be removed.

A cover for a headrest of a vehicle seat may be used. In a lower end region the cover comprises recesses having a closed edge. The headrest rods can be inserted into the recesses. When the cover has been fixed to the headrest rods in this way then the cover can be spanned along the front side of the headrest and fixed in an upper end region by a hook-and-loop-fastener to the upper surface of the headrest. For another embodiment the recesses arranged in the lower end region comprise edge openings which also allow an assembly of the cover to the headrest if the headrest has not been pulled out of the backrest.

A hat rack arranged at a rear side of a backrest of a vehicle seat may be used The hat rack is made of one piece of a rigid material which can be folded along given folding lines. The hat rack comprises one single hook arranged in the upper end region. By the hook it is possible to hook the upper end region of the hat rack with a transverse movement to the headrest rod.

The present disclosure relates to a vehicle seat cover that can be detachably attached or mounted to a vehicle seat. The vehicle seat cover comprises an attachment portion. In the region of the attachment portion it is possible to attach, mount or fix the vehicle seat cover to a headrest rod of the vehicle seat. It is also possible that in the attachment portion the vehicle seat cover is fastened, mounted or fixed to a guiding device for the headrest rod.

The present disclosure proposes a vehicle seat cover that can be detachably attached to a vehicle seat, the vehicle seat cover in particular being improved with respect to
 a simplification of an attachment and/or dis-attachment to the vehicle seat and/or
 the reliability of the attachment to the vehicle seat (e.g. during driving, during movements of the vehicle or passenger on the vehicle seat and/or during a crash).

According to the present disclosure, the attachment portion comprises two layers arranged one above the other. These layers are pliable so that the layers can be deformed by the user in a simple way during the fastening and unfastening or attachment and dis-attachment. The pliable layers in particular do not have an own rigidity so that the pliable layers can be brought into different geometries without considerable elastic returning forces. Here, the different geometries of the layers are preferably stable without returning forces so that after the deformation the layers are able to remain in the respective geometry. In order to mention only non-limiting examples the layers can be manufactured from a textile material, a web, fabric, tissue, woven fabric, knitted fabrics, non-woven fabric, net-like material and the like. Here, the layers might also consist of a plurality of sublayers and/or a plurality of components. The layers might also comprise strengthening elements that can be plastically deformed. However, the present disclosure also covers layers which comprise rigid sub-portions which can then be connected to each other by pliable sub-portions or folding lines or folding edges.

According to the present disclosure, the layers each comprise a recess. The recess is designated for accommodating the headrest rod or guiding device. Accordingly, the recess is dimensioned corresponding to the geometry of the headrest rod or guiding device. The recesses of the two layers each comprise an edge opening by which it is possible to introduce the headrest rod or guiding device into the recess of the respective layer.

On the one hand it is useful that it is easy to access the edge opening in order to allow a simple insertion of the headrest rod or guiding device. This generally means a large dimensioning of the edge opening. However, on the other hand an undesired exit of the headrest rod or guiding device from the recess is to be avoided. For this aim the edge opening should be chosen as small as possible. This conflict of aims is solved by the present disclosure in that for an inventive vehicle seat cover in a top view (or in a projection along the longitudinal axis of the headrest rod) the edge opening of one layer is (partially or completely) covered by an edge of the recess of the other layer. For one possible embodiment of the present disclosure this design allows to generally chose the edge opening of the first mentioned layer comparatively large so that a simple assembly of this layer to the headrest rod or guiding device is possible when deforming the other layer in a way such that the edge of the recess of the other layer does not cover the edge opening of the first mentioned layer. If then the other layer is transferred into the covering geometry (and if therewith the headrest rod or guiding device also enters through the edge opening into the recess of the other layer) the edge of the recess of the other layer is able to make the edge opening of the first mentioned layer smaller or to completely close the edge opening of the first mentioned layer. Accordingly, the undesired exit of the headrest rod or guiding device from the edge opening of the first mentioned layer is at least more unlikely or more difficult. The corresponding applies also for the edge opening of the recess of the second mentioned layer which can be covered (partially or completely) by an edge of the recess of the first mentioned layer.

It is possible that in the assembled state the recesses form an aligned completed recess or stacked accommodation through which the headrest rod or guiding device extends. In this fastened state then the two edge openings of the layers are not arranged one above each other but have an offset in circumferential direction of the stacked accommodation. It is possible that the edge openings are arranged on opposite sides of the stacked accommodation.

For one proposal of the present disclosure the attachment portion comprises a pliable upper layer with an upper recess. Furthermore, the attachment portion comprises a pliable lower layer with a lower recess. In this case the recesses form an upper edge opening and a lower edge opening. In the fastened state the upper layer and the lower layer are arranged one above the other (in particular under establishment of a large contact surface with each other) in a way such that the headrest rod or the guiding device extends through the upper and lower recesses (and through the stacked accommodation formed in this way). In a projection along the longitudinal axis of the headrest rod the lower edge opening of the lower recess is (partially or completely) covered by the edge of the upper recess of the upper layer. Alternatively or cumulatively it is possible that in a projection along the longitudinal axis of the headrest rod the upper edge opening of the upper recess is (partially or completely) covered by the edge of the lower recess of the lower layer.

Generally the edge openings of the two recesses can have an orientation in any direction provided that these directions differ from each other so that the headrest rod or guiding device has to enter into the recess and exit from the same in different directions which provides the desired securing effect.

For one proposal of the present disclosure the edge openings have an orientation in opposite transverse directions. Accordingly, the headrest rod or guiding device has to be inserted in one transverse direction into the recess of one layer whereas the insertion into the other layer has to be provided with an opposite transverse movement. An embodiment of this type leads to a good securing effect if a securing against forces acting in longitudinal direction is intended.

The layers can be connected to each other in any portions. Preferably, one layer is only connected or fixed in a lateral side region to the other layer which might allow a kind of "unfolding" or "folding in opening direction" of the two layers for the fastening and/or unfastening or assembly and/or disassembly.

There are a lot of options for the way of connecting the two layers. Without a limitation of the present disclosure to this embodiment being intended, it is possible that the layers are connected by a bonding or a seam.

It is possible that the layers of the vehicle seat cover are only connected to each other by at least one permanent connection which is responsible for the integrity and also the provision of the securing effect. For one particular proposal of the present disclosure the two layers can be connected to each other in the state fastened to the vehicle seat by an additional detachable connection which might e.g. be a hook-and-loop-fastener. Preferably, with the fixed connection and the additional detachable connection the two layers form a closed ring. The headrest rod or guiding device is then enclosed by the ring.

The securing effect of the vehicle seat cover on the vehicle seat might at least partially base on the effect that a removal of the partial or complete covering of one edge opening of a recess of one layer by the edge of the recess of the other layer requires a relative movement of the two layers contacting each other which again requires to overcome the friction being effective between the layers. This contribution to the securing effect might be increased by one proposal of the present disclosure suggesting that at least one layer comprises a coating increasing the friction or a friction element (e.g. having a friction surface) in the contact region with the other layer.

It is generally possible that the vehicle seat cover is only held on one single headrest rod or guiding device by means of the two layers, the recesses and the respective edge openings. However, it is also possible that the layers each comprise two recesses with edge openings which are then each designated for a respective headrest rod or guiding device. In this case the vehicle seat cover is held at two headrest rods or guiding devices and the securing effect might be increased and/or a precise definition of a position and orientation of the vehicle seat cover relative to the vehicle seat can be provided. Within the frame of the present disclosure there are a lot of options for the type of vehicle seat cover. For one proposal of the present disclosure the vehicle seat cover is a backrest cover which can preferably be placed on the front side of the backrest of the vehicle seat.

It is also possible that the vehicle seat cover is a headrest cover, however the fastening of the headrest cover to the headrest rods being provided by the measures described before. In this case the headrest cover might also comprise a hook-and-loop-fastener in the end region opposite to the attachment portion. By the hook-and-loop-fastener this end region can be fastened to an upper surface of the headrest.

For one solution a vehicle seat is proposed which comprises a backrest cover as explained above. The backrest cover is fastened in the attachment portion to at least one headrest rod or at least one guiding device. The headrest cover then extends from the attachment portion along the front side of the backrest in downward direction. It is possible that the backrest cover (except its fastening by means of the attachment portion) is loosely lying on the vehicle seat or fixed to the same by means of additional attachment portions.

For one solution a vehicle seat is proposed, a headrest cover being fastened to the headrest rod in the attachment portion. In this case the headrest cover extends from the attachment portion along the front side of the headrest in downward direction. As explained before, here it is possible that the headrest cover is detachably fastened to the upper surface of the headrest.

The invention claimed is:

1. A vehicle seat cover designated for a detachable attachment to a headrest rod of a vehicle seat or to a guiding device for the headrest rod, the vehicle seat cover comprising:
a pliable lower layer having a base leg and two side legs parallel to each other and extending in a downward direction from the base leg, wherein the side legs each comprise an angled portion angled in an inner direction, wherein the angled portions have an orientation parallel to the base leg, and wherein at least one lower recess is formed between the base leg and the angled portions;
a pliable upper layer comprising a "T"-shaped protrusion having a vertical leg and two horizontal legs extending away from the vertical leg, wherein at least one upper recess is formed between the horizontal legs and a base body of the upper layer,
wherein the lower layer and the upper layer are connected to each other by a connection and the lower layer and the upper layer at least partially overlap each other, wherein the lower recess and the upper recess are configured for accommodating the headrest rod or guiding device for the headrest rod, wherein the lower recess and the upper recess are aligned with each other and form a stacked accommodation for the headrest rod or the guiding device for the headrest rod, and wherein in a top view the stacked accommodation is defined by an inner edge of the side legs, an upper edge of the angled portions and a lower edge of the base leg of the lower layer, and by a lower edge of the horizontal leg, a lateral edge of the vertical leg and an upper edge of the base body of the upper layer.

* * * * *